Patented May 11, 1943

2,318,781

UNITED STATES PATENT OFFICE 2,318,781

TREATMENT OF HYDROCARBONS

Vladimir N. Ipatieff and Herman Pines, Chicago, Ill., assignors to Universal Oil Products Company, Chicago, Ill., a corporation of Delaware No Drawing. Application June 8, 1940,
Serial No. 339,489

4 Claims. (Cl. 196—10)

This invention relates to the treatment of isoparaffin hydrocarbons to produce higher molecular weight alkyl derivatives thereof. More specifically the process is concerned with a method of alkylating isoparaffin hydrocarbons by olefins in the presence of a particular type of catalyst to produce a motor fuel of relatively high antiknock value. This application is a continuation-in-part of our application Ser. No. 268,346, now Patent No. 2,236,099, which is in turn a continuation-in-part of application Ser. No. 35,237, filed August 8, 1935.

In one specific embodiment the present invention comprises a process for alkylating isoparaffinic hydrocarbons by olefinic hydrocarbons in the presence of a hydrogen halide and a composite of aluminum chloride and a substantially inert carrier.

According to the present invention any of the isoparaffin hydrocarbons may be alkylated including isobutane and its homologs, though obviously under somewhat modified conditions of operation when alkylating isoparaffins of different reactivities. The olefins employed are preferably of lower molecular weight than hexenes and consist essentially of propene, butenes, and pentenes.

In effecting alkylation of isoparaffins by olefins in the presence of unsupported aluminum chloride, intermediate compounds of a metallo-organic nature are formed which frequently possess fluid or semi-fluid properties and consequently result in a running-together of the original particles of catalyst so that less surface is exposed and the speed of the reaction is diminished. Frequently after use in hydrocarbon alkylation reactions of originally finely divided and granular anhydrous aluminum chloride, the catalyst is transformed into a more or less sticky and pasty material which has a greatly diminished catalytic activity and is difficult to treat for the recovery of the aluminum chloride.

A property of anhydrous aluminum chloride which must be taken into account is its tendency to sublime at approximately 180° C., so that if it is employed at temperatures above this point, it must ordinarily be injected or sublimed into the reaction zone. In the process of the present invention in which the aluminum chloride employed is strongly adsorbed by granular material, both of the disadvantages enumerated are to a large extent overcome since the tendency of the chloride to volatilize is counteracted partially by the adsorbent action of the supports employed and these supports further act to adsorb and retain some of the various addition compounds and prevent the composite catalyst granules from adhering to form large agglomerates.

The general method of preparation of the types of granules whose use in alkylation reactions characterizes the present invention consists in mixing aluminum chloride and a granular supporting material in an apparatus which will withstand some pressure and then in heating under elevated temperatures and pressures until the chloride has been adsorbed into the pores of the support.

Supporting materials which may be utilized in the preparation of the present type of alkylating catalysts comprise various types of activated carbon, diatomaceous earth, silica, alumina, magnesia and other oxides, magnesite, crushed firebrick, aluminum silicates, porcelain, clays, fuller's earth, pumice, bentonite, montmorillonite, etc., and in general refractory porous substances which have substantially no reactivity with anhydrous aluminum chloride.

Another advantage of using a supported catalyst lies in the fact that aluminum chloride is diluted by the carrier and, therefore, the reaction catalyzed is less energetic than that which would occur in the presence of unsupported aluminum chloride, and consequently the destructive alkylating tendency of unsupported aluminum chloride to decompose the alkylation product, especially at temperatures of 50° C. and higher, is substantially avoided.

The proportions of adsorbent carrier and aluminum chloride may be varied as desired to make catalyst composites of different activities. It has been found possible and practical in the case of aluminum chloride to make stable granular catalysts resistant to disintegrating influence by using up to approximately one part by weight of anhydrous aluminum chloride per part by weight of adsorptive support or carrier. These materials, after thorough mechanical mixing in the desired proportion, may be placed in a pressure vessel which is preferably made of or lined with suitable corrosion resistant material, the vessel is placed under a pressure of approximately 25 atmospheres by the introduction of hydrogen or of another inert gas, and then the vessel and contents are heated at approximately 250° C. for several hours. Hydrogen chloride may also be added, if desired, prior to the heating either in the presence or absence of an added gas as hydrogen.

After such a treatment of the original mixture, a product is obtained in the form of a dry granular composite of aluminum chloride and carrier. From the appearance of the composite, the aluminum chloride seems to have disappeared although it is actually in the pores and on the surface of the adsorbent as evidenced by the violent reaction of the granules of the composite with water and the catalytic activity in organic reactions. This procedure is typical of the preparation of any number of similar catalysts using different combinations of the metal chloride on the supports already mentioned.

The term "activated carbon" as used in the present specification is intended to include any type of prepared carbon or carbonaceous material which is more or less granular and possessed of good porosity and structural strength and which has been prepared by general steps involving the leaching of adsorbed materials from granular residual carbonaceous materials such as wood char and various varieties of coke by mineral acids and by the controlled heating, preferably under vacuum, to expel adsorbed liquids and gases. It is recognized that various forms of active granular chars will vary considerably in adsorptive capacity, and therefore the properties of catalysts prepared from them in accordance with the present invention will vary both in respect to the amount of aluminum chloride which they are able to adsorb and in respect to the periods of service in which the catalysts are able to maintain a practical alkylating activity.

It is proposed to carry out the alkylation of isoparaffins by olefins in the presence of supported aluminum chloride at a temperature within the approximate range of —25 to 200° C. under a pressure of from substantially atmospheric to approximately 1000 pounds per square inch. In the hydrocarbon mixture subjected to alkylation it is preferable to have present 3 or more molecular proportions of isoparaffin per molecular proportion of olefinic hydrocarbon. A small quantity of hydrogen chloride is preferably added, generally to the extent of approximately 0.5–5% by weight of the total hydrocarbon mixture subjected to contact with the alkylating catalyst. It is also recommended to have hydrogen present in the reaction mixture, generally in a quantity of not more than 10 mole per cent of the total hydrocarbons.

The process of alkylating isobutane, isopentane, or another isoparaffin by olefinic hydrocarbons may be carried out using either batch or continuous operation. Thus in batch type operation a suspension of an aluminum chloride-carrier composite may be made in a hydrocarbon mixture which is agitated in treaters preferably in the presence of hydrogen and hydrogen chloride until the alkylation reaction reaches completion. Or the mixture of hydrocarbons and catalyst suspended therein may be passed through a tortuous path in some type of baffled mixer to accomplish the same results. The particular conditions of temperature and pressure to be employed in such an alkylating treatment will necessarily vary with the molecular weight and reactivity of the olefin, the activity of the catalyst composite, and other factors. Similarly the alkylation treatment may be carried out continuously by passing the isoparaffin-olefin mixture through a fixed section of the granular aluminum chloride-containing catalyst contained in a tube or tower or a plurality of such reactors and maintained under the desired operating conditions to produce a substantially saturated alkylate of motor fuel boiling range, high octane number, and good lead susceptibility.

The following examples are introduced as characteristic of the practical operation of the present process although they are not presented with the intention of limiting the scope of the invention in exact correspondence with the numerical data since some latitude is possible in the proportions of adsorbent to aluminum chloride, and temperature and pressure may be varied also within the limits hereinabove set forth:

EXAMPLE I 106 parts by weight of 4–10 mesh formed particles of diatomaceous earth and 71 parts by weight of sublimed anhydrous aluminum chloride were sealed in a nickel-lined autoclave to which was added 8 parts by weight of anhydrous hydrogen chloride. The pressure in the autoclave was then raised to 25 atmospheres by introduction of hydrogen after which the autoclave was rotated at 250° C. for 2 hours. During this treatment the 106 parts by weight of granular diatomaceous earth was impregnated with 36 parts by weight of the aluminum chloride forming a catalyst composite containing approximately 25% by weight of aluminum chloride.

100 parts by volume (53 parts by weight) of the above described aluminum chloride-diatomaceous earth composite was placed in a stainless steel reaction vessel through which a propene-isobutane mixture was passed upwardly. Upon the basis of a number of runs made at temperatures from —30 to 100° C. under a pressure of 400 pounds per square inch best results were obtained at 70° C. while using a liquid isobutane-propene space velocity of approximately 3. At the higher space velocities polymerization predominated over alkylation thus causing a decrease in yield of liquid products and an increase in the proportion of products boiling above gasoline. Results given in Table I on two runs made at the optimum space velocity and temperature permit comparison of the relative effect on the reaction of the isobutane-propene ratio.

TABLE I

*Alkylation of isobutane by propene in the presence of aluminum chloride-diatomaceous earth granules*

|  | Run No. | |
| --- | --- | --- |
|  | 1 | 2 |
| Molecular proportions, isobutane: propene | 9 | 18 |
| Temperature, °C | 72 | 72 |
| Pressure, lbs. per sq. in | 400 | 400 |
| Liquid space velocity | 3.1 | 3.1 |
| Liquid product: |  |  |
| Per cent by wt. of propene reacted | 221 | 250 |
| Bromine number | 0 | 0 |
| Per cent by vol. boiling above 200° C | 4 | 0 |
| Composition, vol. per cent: |  |  |
| $C_5$ | 31 | 37 |
| $C_6$ | 12 | 8 |
| $C_7$ | 30 | 35 |
| $C_8$ | 14 | 13 |
| $C_9$ | 4 | 3 |
| $C_9$–200° C | 5 | 4 |
| Above 200° C | 4 | 0 |

Thus by reducing the olefin concentration in the charge used in run No. 2 to approximately one half that used in run No. 1, it was possible to eliminate products boiling above 200° C. and at the same time to increase slightly the pentane and heptane fractions. The distillation data showed that the pentane fraction was approximately as large as the heptane fraction, a fact indicating autodestructive alkylation which is generally considered as a decomposition to hydrocarbon fragments followed by subsequent alkylation to produce saturated products of lower and higher boiling range.

EXAMPLE II

A fresh portion of the catalyst prepared as described in Example I was employed in a run on the alkylation of isobutane by propene in the presence of relatively small quantities of added hydrogen chloride. The hydrogen chloride was added in admixture with a portion of the isobutane to the isobutane-propene charge just prior to introduction to the bottom of the catalyst reactor. Results given in Table II show that the yield of alkylation product is increased and its end point is decreased by the presence of hydrogen chloride added in the amounts indicated.

TABLE II

*Alkylation of isobutane by propene in the presence of aluminum chloride-diatomaceous earth granules under a pressure of 400 lbs. per square inch*

|  | Run No. | | | |
| --- | --- | --- | --- | --- |
|  | 3 | 4 | 5 | 6 |
| Temperature, °C | 32 | 30 | 72 | 68 |
| Liquid space velocity | 3.3 | 4.0 | 3.1 | 3.9 |
| Time on test, hours | 4.5 | 4.0 | 4.0 | 6.0 |
| Hydrogen chloride added, parts by wt. HCl:AlCl₃ | 0 | 0.5 | 0 | 0.3 |
| Liquid products, per cent by wt. of propene charged | 162 | 250 | 221 | 268 |
| Vol. per cent boiling above 200° C | 14 | 0 | 4 | <5 |

EXAMPLE III 100 parts by volume of the aluminum chloride diatomaceous earth catalyst was used as a filler in a reactor through which was passed during 30 hours 5730 parts by weight of a mixture consisting of 5.7% by weight of propene, 2.7% propane, 77.4% isobutane, 13.7% normal butane, and 0.5% pentane. Hydrogen chloride dissolved in butane was added throughout the run at the approximate hourly rate of 0.09 part by weight per part by weight of aluminum chloride. During the run which was divided into 5 periods of 6 hours each, the yield of liquid products relative to propene charged decreased progressively from 316% in the first period to 171% in the fifth period. The total liquid product formed which had an octane number of 80 was equivalent to approximately 12.3 gallons per pound of aluminum chloride contained in the catalyst.

The novelty and utility of the process of this invention are evident from the preceding specification and the numerical data presented, although neither section is intended to unduly limit its generally broad scope.

We claim as our invention:

1. A process for synthesizing hydrocarbons which comprises alkylating an isoparaffin with an olefin in the presence of a solid composite resulting from the heating of a mixture of aluminum chloride and a refractory porous material under substantial superatmospheric pressure to a temperature above the normal sublimation point of aluminum chloride.

2. A process for producing hydrocarbons boiling in the gasoline range which comprises alkylating isobutane with a normally gaseous olefin in the presence of a solid composite resulting from the heating of a mixture of aluminum chloride and a refractory porous material under substantial superatmospheric pressure to a temperature above the normal sublimation point of aluminum chloride.

3. A process for synthesizing hydrocarbons which comprises alkylating an iso paraffin with an olefin in the presence of hydrogen chloride and a solid composite of aluminum chloride with a relatively inert granular carrier.

4. A process for producing hydrocarbons boiling in the gasoline range which comprises alkylating isobutane with a normally gaseous olefin in the presence of hydrogen chloride and a solid composite of aluminum chloride with a relatively inert granular carrier.

VLADIMIR N. IPATIEFF.
HERMAN PINES.